3,773,775
BIS-QUATERNARY PYRIDINIUM SALTS
Ilse Hagedorn, Darmstadt, Germany, assignor to Merck Patent Gesellschaft mit beschrankter Haftung, Darmstadt, Germany
No Drawing. Filed Aug. 27, 1968, Ser. No. 755,752
Int. Cl. C07d 31/40
U.S. Cl. 260—295.5 A                     3 Claims

ABSTRACT OF THE DISCLOSURE (2 - hydroxyiminomethylpyridinium - 1 - methyl) - (R-pyridinium-1-methyl) ethers, wherein R is either hydrogen, methyl, methoxycarbonyl, aldoxime or aminocarbonyl, are useful as pharmaceuticals for treating and alleviating symptoms of poisoning caused by phosphorus-containing plant-protective agents and war gases.

SUMMARY OF THE INVENTION

Quaternary ammonium pyridinium salts of the formula $$\left[\underset{CH=NOH}{\text{Pyr}}\overset{\oplus}{N}-CH_2-O-CH_2-\overset{\oplus}{N}\underset{R}{\text{Pyr}}\right] X^{\ominus} \quad (I)$$

wherein
R is either —H, —CH$_3$, —COOCH$_3$, —CH=NOH or —CONH$_2$, and is in any one of the positions 2-, 3- and 4-; and
X is an equivalent of a mono- or polyvalent anion; counteract the symptoms of poisoning caused by modern phosphorus-containing plant-protective agents and war toxicants. Those compounds wherein the anion is such that the quaternary salts I are not pharmaceutically acceptable may be converted by well-established procedures into therapeutically useful quaternary salts I. The therapeutically useful salts are independent of the position of R or its particular meaning within the indicated group; they can be administered orally, parenterally or topically to mammals poisoned by a phosphorus-containing compound of the type noted. The daily dosage varies from compound to compound and is dependent upon the severity of the poisoning being treated. Suitable doses are from 50 milligrams (mg.) to 20 grams (g.) and can be administered as a single dose.

Compounds I are prepared, e.g. by reacting a compound of one of the formulas:

$$\underset{CH=NOH}{\text{Pyr}}\overset{\oplus}{N}-CH_2-O-CH_2-Y \quad X^{\ominus} \quad \text{and} \quad \underset{R}{\text{Pyr}}\overset{\oplus}{N}-CH_2-O-CH_2-Y \quad X^{\ominus}$$

$$(II) \qquad\qquad\qquad (III)$$

wherein
R and X have their above-noted meanings; and
Y is a residue which can be substituted by a compound of Formula IV;
with a corresponding compound of the formula:

$$\underset{R}{\text{Pyr}}N \quad (VI)$$

the products are precipitated and crystallized according to established procedures.

It is an object of this invention to provide pharmaceutically acceptable compounds which are administrable either enterally, parenterally, or topically for alleviating and overcoming symptoms of poisoning caused by phosphorus-containing compounds, particularly phosphoric acid esters.

A further object is to provide compounds of Formula I for this purpose.

Another object is to provide intermediates II and III for the preparation of compounds I.

A still further object is to provide a pharmaceutical preparation containing an effective dosage of a compound of Formula I in addition to conventional carriers and additives, particularly wherein the compound of Formula I is [(2-hydroxy-iminomethyl)-pyridinium-(1)-methyl]-[(3-carbamoyl)-pyridinium-(1)-methyl] - ether dichloride. It is also an object of the present invention to provide a pharmaceutical preparation containing an effective dosage, e.g. 50 mg. to 20 g. of [(2-hydroxy-iminomethyl) - pyridinium - (1)-methyl]-[(4-hydroxy-iminomethyl) - pyridinium - (1)-methyl]-ether dichloride in addition to conventional carriers and additives.

Still further objects are apparent from the description and examples which follow.

DETAILED DISCUSSION OF THE INVENTION

Of the quaternary pyridinium salts of Formula I, preferred embodiments are:

bis-[(2-hydroxy-iminomethyl)-pyridinium-(1)-methyl]-ether dichloride;
[(2-hydroxy-iminomethyl)-pyridinium-(1)-methyl]-[(3-hydroxy-iminomethyl)-pyridinium-(1)-methyl]-ether dichloride;
[(2-hydroxy-iminomethyl)-pyridinium-(1)-methyl]-[(4-hydroxy-iminomethyl)-pyridinium-(1)-methyl]-ether dichloride;
[(2-hydroxy-iminomethyl)-pyridinium-(1)-methyl]-[(3-carbamoyl)-pyridinium-(1)-methyl]-ether dichloride; and
[(2-hydroxy-iminomethyl)-pyridinium-(1)-methyl]-[pyridinium-(1)-methyl]-ether dichloride.

In the preparation of compounds I, any compound II is reacted with any compound IV, or any compound III is reacted with pyridine-2-aldoxime. In compounds II and III substituent Y is preferably a halogen, e.g. chloro and bromo, or R$_3$—SO$_2$—O—, such as alkylsulfonyloxy, particularly lower alkylsulfonyloxy having from 1–4 carbon atoms, e.g. methylsulfonyloxy, or arylsulfonyloxy, preferably monocarbocyclic arylsulfonyloxy, e.g. phenylsulfonyloxy. R$_3$ is a hydrocarbon residue which is either aliphatic, aromatic or cycloaliphatic.

The reaction is preferably effected in a solvent, such as dimethylformamide, CHCl$_3$ or acetonitrile, in which case the substituent Y, e.g. a halogen, appears in the obtained final product as anion X$^{\ominus}$. The solvents are not limited to these, however, and other solvents, such as dichloromethane, dioxane, tetrahydrofurane or nitrobenzene, can be used alternatively.

The reaction is conducted within a temperature range between —10° C. and 200° C., preferably between +20° C. and +80° C. Normally, the reaction products of Formula I separate from the reaction mixture and are purified by recrystallization from, for example, lower alkanols, such as ethanol or isopropanol.

Furthermore, a compound of Formula V:

$$\left[\underset{R_1}{\text{Pyr}}\overset{\oplus}{N}-CH_2-O-CH_2-\overset{\oplus}{N}\underset{R_2}{\text{Pyr}}\right] X^{\ominus} \quad (V)$$

wherein
each of R$_1$ and R$_2$ is CHO; or
R$_1$ is CH=NOH and R$_2$ is CHO; or
R$_1$ is CHO and R$_2$ is R, obtainable, for example, by reacting pyridine-2-aldehyde with [3-carbamoyl-pyridinium-(1)-methyl]-chloromethylether chloride in dimethyl formamide, can be oximized to compounds of Formula I with hydroxylamine hydrochloride, with the addition of the equivalent amount of alkali, such as NaOH or KOH, preferably in an aqueous or aqueous-ethanolic solution at temperatures between −20° C. and +100° C., as described in greater detail in Houben-Weyl, "Methoden der Organischen Chemie," vol. VII/1 (1954), pp. 471–474. However, it is likewise possible to employ solvent mixtures of water with dimethyl formamide, dioxane, dimethyl sulfoxide, acetonitrile or tetrahydrofurane. Working-up is advantageously effected by concentrating the reaction mixture gently by evaporation under vacuum and isolating the reaction product of Formula I by extraction with isopropanol.

Further, the anion $X^\ominus$ in a compound of Formula I can be replaced by another anion $X^\ominus$. Thus, the anion $X^\ominus$ can represent a chlorine ion or hydroxyl ion and can subsequently be exchanged, in accordance with conventional methods, for another anion, e.g. converted by treatment with perchloric acid into the corresponding bis-perchlorate or by the effect of sodium methane sulfonate into the corresponding bis-methanesulfonate.

For pharmaceutically acceptable quaternary salts of Formula I the anion X may be that of an organic acid, e.g. tartaric acid; inorganic acid, e.g. hydrochloric acid, hydrobromic acid and sulfuric acid; monobasic acid, e.g. an alkanesulfonic acid, such as methanesulfonic acid; dibasic acid, e.g. succinic acid; tribasic acid, e.g. phosphoric acid and citric acid; saturated acid, e.g. acetic acid; ethylenically unsaturated acid, e.g. maleic acid and fumaric acid; or that of an aromatic acid, e.g. salicylic acid and an arylsulfonic acid, such as benzenesulfonic acid. The selected anion X does not nullify the therapeutic properties of compounds I; selection is made, rather, on therapeutic acceptability. The novel compounds of general Formula I are normally crystalline, water-soluble salts.

Intermediates of Formula II or III are obtained by reacting pyridine-2-aldoxime or compounds of Formula IV with disubstituted ethers of Formula VI $$Y—CH_2—O—CH_2—Y \qquad (VI)$$

wherein Y has the above-indicated meaning, preferably in inert solvents, such as chloroform, dichloromethane, acetonitrile, nitromethane, dimethylsulfoxide, dimethylformamide, dioxane or tetrahydrofuran. Preferably, the reaction components are employed in a molar ratio of 1:1.2, and the process is conducted at temperatures of up to 80° C. In general, the reaction products are obtained in crystalline phase and obtained in a sufficiently pure form for further reactions by post-washing with an inert solvent.

The novel compounds of Formula I can be processed to all forms of preparations customary for pharmaceutical purposes. For example, pills, tablets, dragées, solutions, emulsions, syrups and injection solutions can be produced therefrom. Suitable pharmaceutical excipients are those organic substances which are adapted for parenteral, enteral or topical application and which do not react with the novel compounds, such as water, vegetable oils, polyethylene glycols, gelatin, lactose, amylose, magnesium stearate, talc, Vaseline, cholesterol, etc. Especially suitable for parenteral application are solutions, preferably oily or aqueous solutions, as well as suspensions or emulsions. For enteral application tablets or dragées can be employed; for topical application salves or creams which can be sterilized or mixed with auxiliary substances, such as preservatives, stabilizers or wetting agents, or salts for influencing the osmotic pressure, or with buffer substances, are preferred.

Each of the pharmaceutically active compounds of this invention may be, e.g. incorporated, for oral administration, in a tablet as the sole active ingredient. A typical dosage tablet is constituted by from 1 to 3 percent binder, e.g. tragacanth; from 3 to 10 percent disintegrating agent, e.g. corn, starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well known in the art, employing the necessary amounts of conventional granulating liquids, e.g. alcohol SD-30 and purified water. An exemplary tabletting formulation for the instant active compounds is:

|  | Parts |
|---|---|
| Compound of Example 1 | 50 |
| Tragacanth | 2 |
| Lactose | 39.5 |
| Corn starch | 5 |
| Talcum | 3 |
| Magnesium stearate | 0.5 |
| Alcohol SD-30, q.s. | |
| Purified water, q.s. | |

As can be seen from Table 1, [(2-hydroxyiminomethyl)-pyridinium-(1)-methyl]-[(3 - carbamoyl)-pyridinium-(1)-methyl]-ether dichloride (HS–6) exhibits a far greater protective effect than the commercial preparation Toxogonin® (active agent: bis-[4-hydroxy-iminomethyl-pyridinium - (1) - methyl]-ether dichloride for female mice of the NMRI line, which mice were orally poisoned under atropine protection with commercial insecticidal preparations of the alkyl phosphate group.

TABLE 1

Toxicity Tests on Female Mice of the NMRI-Line Regarding the Influence of Toxogonin® and HS-6 on the Toxicity of Insecticidal Preparations

| Preparation | LD₅₀ p. os in ηl./kg. | CD₅₀ intravenously [1] Toxogonin® | HS-6 |
|---|---|---|---|
| PD₅® (50% Phosdrin®) | ³15 (13.5-17.5) | 19.4 (15.8-25.6)³ | ³3.3 (2.3-4.5) |
| Meta-Systox® (50% Demeton-O-methyl sulfoxide) | ⁴86 (75-101) | 29.0 (21.0-40.0)³ | ³2.0 (1.5-3.0) |
| Malathion (technical) (1% solution in dimethyl sulfoxide) | ²⁴145 (110-188) | 10-50 in each case, 50% dead⁴ | ⁴5.6 (2.3-13.5) |
| Anthio® (25% Formothion) | ³1,100 (850-1,400) | No survival (tested up to 50 mg./kg.)⁴ | ³15.0 (4.0-25.0) |

[1] As compared to double the oral LD₅₀ of the insecticidal preparation in mg./kg.
[2] Contrary to the other preparations tested, this dosage refers to the active agent.
[3] 1 hours.
[4] 24 hours.

Thus, HS–6 is six times as effective as Toxogonin against PD₅® poisoning (active agent: O,O-dimethyl-carbomethoxy-propenyl phosphate); about 15 times as effective as Toxogonin against Meta-Systox® poisoning (active agent: dimethyl-thiono-phosphoric acid-(β-ethylmercapto)-ethyl ester); and is significantly stronger, in particular, against Malathion poisoning (active agent: O,O-dimethyl-dithiophosphoric acid-S-(1,2-dicarbethoxy-ethyl)-ester) and against Anthio® poisoning (active agent: O,O-dimethyl-dithio-phosphorylacetic acid - N - methyl - N-formylamide).

The experiments listed in Table 1 were conducted in the same manner as those published by Zech, Erdmann and Engelhard in "Arzneimittelforschung," 17, p. 1200, Table 4.

The test animals employed were female mice of the NMRI-line. Following the practice with respect to poisons, the animals were poisoned orally with the insecticidal alkyl phosphates listed in Table 1. The counter-treatment with HS–6 or Toxogonin® was effected *15 minutes after* the oral feeding of the alkyl phosphate by a single intravenous administration of the antidote (*without* atropine);

however, the administered dose of the antidote was varied in order to determine quantitative relationships (determination of $CD_{50}$ [=median curative dosage; a dose that abolishes symptoms in 50 percent of the test subjects]).

Th superiority of HS–6 as an antidote becomes even more apparent when considering that, in accordance with German Pat. 1,190,941 and U.S. Pat. 3,137,702, substantial advantages are claimed for Toxogonin® over 2-PAM (2 - hydroxy - iminomethyl-N-methyl-pyridinium iodide) and TMB–4 (1,3 - bis-[4'-hydroxy-iminomethyl-pyridinium-(1')]-propane dibromide) against poisoning by phosphorus-containing plant-protective agents. For example, the superiority of HS–6 and [(2-hydroxy-iminomethyl)-pyridinium - (1) - methyl] - [(4-hydroxy-iminomethyl)-pyridinium-(1)-methyl]-ether dichloride can be explained by the fact that these compounds represent a novel antidote principle: they effect a hydrolytic inactivation of poisonous phosphoric acid esters within the organism. In this connection, they are less poisonous than the antidote TMB–4. HS–6 is only half as toxic as Toxogonin®, as can be seen from Table 2.

TABLE 2

$LD_{50}$ (Toxicity) of Various Antidotes on Female NMRI-Mice

|  | Intravenous $LD_{50}$ in mg./kg. | Intramuscular $LD_{50}$ in mg./kg. |
|---|---|---|
| 2-PAM-Chloride [1] | 90 | 180 (172–205) |
| P2S [2] | 132 (120–143) | 229 (226–236) |
| TMB–4 | 45 (41–50) | 102 (82–110) |
| Toxogonin® | 70 (59–88) | 172 (160–188) |
| HS–6 | 190 (160–220) | 350 (320–380) |

[1] 2-hydroxy-iminomethyl-N-methyl-pyridinium chloride.
[2] 2-hydroxy-iminomethyl-N-methyl-pyridinium methyl sulfate.

Without further elaboration, it is believed that one skilled in the art can, using the preceding description, utilize the present invention to its fullest extent The following preferred specific embodiments are, therefore, to be construed as merely illustrative, and not limitative of the remainder of the specification and claims in any way whatsoever.

EXAMPLE 1

In 150 ml. of dry chloroform 1.22 g. of pyridine-2-aldoxime is dissolved in the warm state and mixed with 2.4 g. of [(2-hydroxy-iminomethyl)-pyridinium-(1)-methyl]-chloromethyl-ether chloride. Under vigorous stirring and exclusion of moisture, the suspension is maintained at the boiling point for 5 hours. Thereafter, the suspension is vacuum filtered while still warm, and washed twice, once with dry alcohol and once with diethylether.

The reaction product is 2.6 g. of crude bis-[(2-hydroxy-iminomethyl)-pyridinium(1) - methyl] - ether dichloride, exhibiting, after recrystallization from aqueous methanol, a decomposition point starting at 175° C.

Replacing the pyridine-2-aldoxime with an equivalent of either 2-methylpyridine or picolinic acid methyl ester results in the preparation, in similar manner, of the corresponding compound I.

EXAMPLE 2

In 32.5 ml. of absolute acetonitrile 1.22 g. of pyridine-3-aldoxime is dissolved and reacted, analogously to Example 1, with 2.4 g. of [(2-hydroxy-iminomethyl)-pyridinium-(1)methyl]-chloromethyl-ether chloride.

2.9 g. of crude [(2-hydroxy-iminomethyl)-pyridinium-(1)-methyl]-[(3-hydroxy-iminomethyl)-pyridinium - (1)-methyl]-ether dichloride are obtained, exhibiting a decomposition point of 169°–170° C. after recrystallization from methanol/isopropanol.

Replacing the pyridine-3-aldoxime with an equivalent of either 3-methylpyridine or nicotinic acid methyl ester results in the preparation, in similar manner, of the corresponding compound I.

EXAMPLE 3

In 15 ml. of absolute chloroform, 1.22 g. of pyridine-4-aldoxime are dissolved in the warm phase and reacted, analogously to Example 1, with 2.4 g. of [(2-hydroxy-iminomethyl) - pyridinium - (1) - methyl] - chloromethyl-ether chloride.

2.6 g. of crude [(2-hydroxy-iminomethyl)-pyridinium-(1)-methyl]-[(4-hydroxy-iminomethyl)-pyridinium - (1) methyl]-ether dichloride is obtained, having a decomposition point of 177°–178° C. after recrystallization from methanol/isopropanol, with the addition of a small amount of acetone.

Replacing the pyridine-4-aldoxime with an equivalent of either 4-methylpyridine or isonicotinic acid methyl ester results in the preparation, in similar manner, of the corresponding compound I.

EXAMPLE 4

1.22 g. of nicotinic acid amide and 2.4 g. of [(2-hydroxy - iminomethyl) - pyridinium - (1) - methyl] - chloromethyl-ether chloride are heated in 60 ml. of dimethyl formamide for 4 hours at 30°–40° C. and then worked up analogously to Example 1, thus yielding 2.7 g. of crude [(2 - hydroxy - iminomethyl) - pyridinium - (1) - methyl]-[(3-carbamoyl)-pyridinium-(1)-methyl]-ether dichloride, which melts, after recrystallization from aqueous isopropanol, at 155–156° C.

Replacing the nicotinic acid amide with an equivalent of either picolinic acid amide or isonicotinic acid amide results in the preparation, in similar manner, of the corresponding compound I.

EXAMPLE 5

A mixture of 7.9 g. of absolute pyridine and 1.2 g. of [(2 - hydroxy - iminomethyl) - pyridinium - (1) - methyl]-chloromethyl-ether chloride in 30 ml. of dimethyl formamide is heated, under stirring, for 5 hours at 50° C. Then, the precipitate is vacuum filtered and washed with chloroform and diethylether. After recrystallization from aqueous methanol/isopropanol, there is obtained 1.3 g. of [(2-hydroxy - iminomethyl) - pyridinium - (1) - methyl]-[pyridinium-(1)-methyl]-ether dichloride, having a decomposition point of 142°–143° C.

EXAMPLE 6

3.65 g. of bis-[2-formyl-pyridinium-(1)-methyl]-ether dichloride are dissolved in 40 ml. of water and heated for 15 minutes on a water bath with 1.68 g. of hydroxylamine hydrochloride. Then, the hydrochloric solution is neutralized with sodium acetate, once again heated for 10 minutes, and 0.204 g. of sodium nitrate is added thereto. Upon cooling, the nitrate of bis-[2-hydroxy-iminomethyl-pyridinium-(1)-methyl]-ether crystallizes in a 65% yield.

The starting material is obtained as follows:

Under stirring, at 60°–80° C., 1.48 g. of dichloromethyl ether is added dropwise to 2.4 g. of pyridine-2-aldehyde (freshly distilled) in 4 ml. of dry dimethyl formamide. After a short time, the dichloride precipitates, is vacuum filtered, and washed with diethylether. Yield: at least 85%. The yellowish, slightly oily bis-[2-formyl-pyridinium-(1)-methyl]-ether dichloride is precipitated as a colorless, crystalline dihydrate from a very small amount of water to which some HCl is added, with acetone.

EXAMPLE 7

Under cooling, 1.8 g. of dipotassium hydrogen phosphate in 20 ml. of water are added under stirring to 3.6 g. of bis-[2-hydroxy-iminomethyl - pyridinium-(1)-methyl]-ether dichloride in 16 ml. of water. Bis-[2-hydroxy-iminomethyl-pyridinium - (1) - methyl]-ether monophosphate precipitates at once in shiny, bright yellow platelets.

EXAMPLE 8

3.6 g. (0.01 mol) of bis-[2-hydroxy-iminomethyl-pyridinium-(1)-methyl]-ether dichloride in 20 ml. of water are combined under stirring with 1.7 g. of sodium bicarbonate in 20 ml. of water. There precipitates immediately bis-[2 - hydroxy-iminomethyl-pyridinium - (1) - methyl]-ether dihydrogen carbonate in the form of a yellowish salt.

EXAMPLE 9

3.59 g. of bis-[2-hydroxy-iminomethyl-pyridinium-(1)-methyl]-ether dichloride are dissolved in 70 ml. of warm 90% aqueous methanol and mixed, under stirring, with 3.30 g .of silver succinate. The reaction solution is heated at 50–60° C. for 5 minutes. The thus-precipitating product is filtered off. After the addition of diethylether, bis-[2-hydroxy-iminomethyl-pyridinium - (1) - methyl]-ether succinate crystallizes.

EXAMPLE 10

Under heating, 3.05 g. of pyridine-2-aldoxime are dissolved in 15 ml. of dry chloroform. With stirring and under exclusion of moisture, 3.16 g. of α,α-dichlorodimethyl ether in 5 ml. of dry chloroform are slowly added dropwise at 40°–50° C. (about 30 drops per minute). After 10 minutes, the solution becomes cloudy. The agitation is continued for 4 hours at 45° C., and the reaction mixture is allowed to stand overnight.

The precipitate is vacuum filtered, washed with chloroform and dried under vacuum at 60° C., thus yielding 4.78 g. of [(2-hydroxy - iminomethyl) - pyridinium-(1)-methyl]-chloromethyl-ether chloride having a decomposition starting point of 122° C., melting at 138° C.

This crude product is sufficiently clean for further reactions.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A pharmaceutically acceptable quaternary salt of the formula

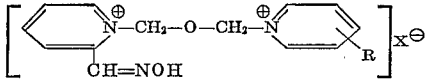

wherein R is —CO—O—CH$_3$ in one of the positions 2-, 3- and 4- and X is an equivalent of a mono- or polyvalent anion.

2. A pharmaceutically acceptable quaternary salt of the formula

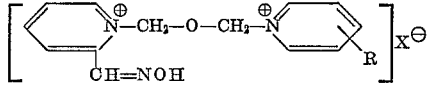

wherein R is —CONH$_2$ in one of the positions 2-, 3- and 4- and X is an equivalent of a mono- or poly-valent anion.

3. The compound according to claim 2 which is [(2-hydroxy-iminomethyl) - pyridinium - (1) - methyl] - [(3-carbamoyl)-pyridinium-(1)-methyl] - ether dichloride.

References Cited

UNITED STATES PATENTS

| | | | |
|---|---|---|---|
| 3,045,025 | 7/1962 | Hackley et al. | 260—296 |
| 3,137,702 | 6/1964 | Lüttringhaus et al. | 260—296 |

FOREIGN PATENTS

| | | | |
|---|---|---|---|
| 1,190,941 | 4/1965 | Germany | 260—296 |

HENRY R. JILES, Primary Examiner

G. TODD, Assistant Examiner

U.S. Cl. X.R.

260—294.8 R, 295 R, 295 Q, 295.5 R, 296 D, 296 M; 424—263, 266